Sept. 3, 1940.   J. P. RATHBUN   2,213,410.
HIGH PRESSURE CLOSURE FOR PRESSURE VESSELS
Filed Dec. 15, 1938
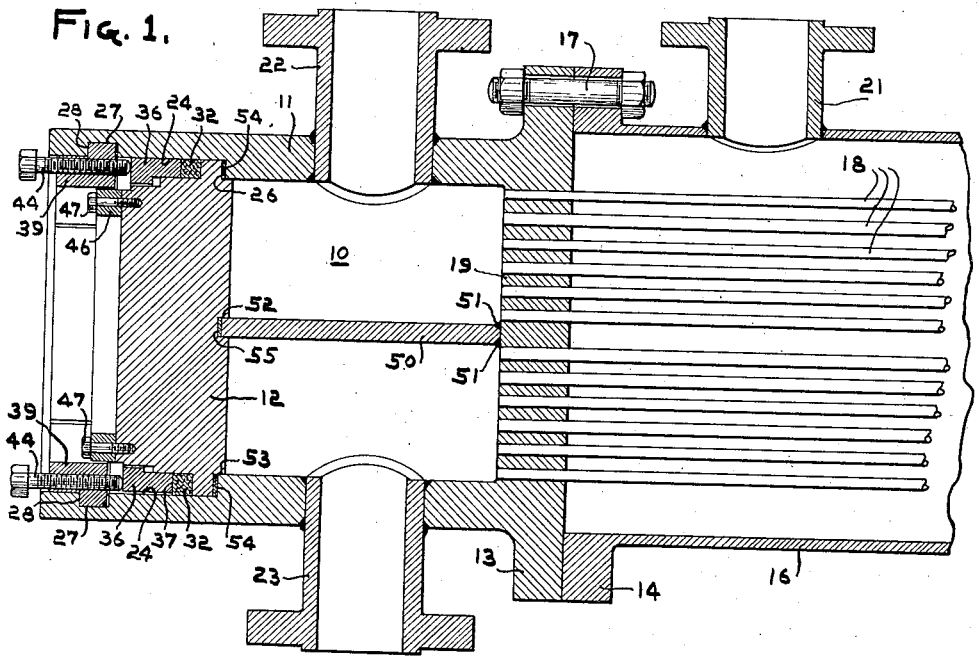
Fig. 1.
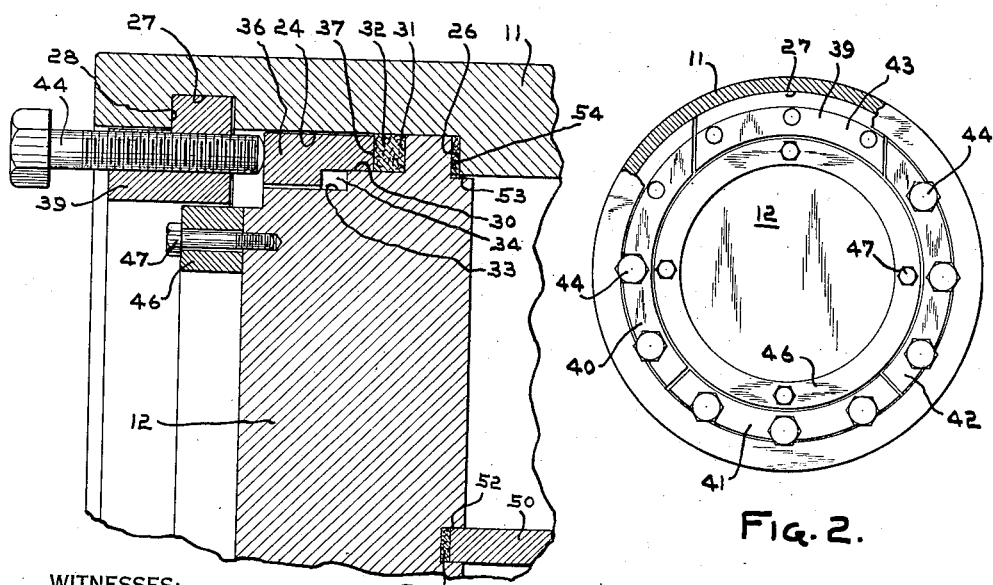
Fig. 3.
Fig. 2.
WITNESSES:
Ralph T. French
James F. Mosser
INVENTOR
JOHN P. RATHBUN.
BY
A. B. Reavis
ATTORNEY Patented Sept. 3, 1940

2,213,410

UNITED STATES PATENT OFFICE 2,213,410

HIGH PRESSURE CLOSURE FOR PRESSURE VESSELS

John P. Rathbun, Prospect Park, Pa., assignor to Westinghouse Electric & Manufacturing Company, East Pittsburgh, Pa., a corporation of Pennsylvania Application December 15, 1938, Serial No. 245,851

2 Claims. (Cl. 257—239)

My invention relates to closures for pressure vessels and more particularly to covers or closure members for high-pressure heads of heat exchanger apparatus, and has for an object the provision of a pressure-sealed, high-pressure head of a multiple-pass type wherein the use of an inner cover is not required.

A further object of the invention is the provision, in a pressure-sealed high-pressure head of the multiple-pass type, of a partition separating two or more of the passes, together with a novel sealing arrangement.

Yet another object of the invention is the provision, in a pressure-sealed, high-pressure head of the two-pass type, of a partition separating the two passes and extending from the tube plate to the main cover and having sealing engagement with the latter.

These and other objects are effected by my invention as will be apparent from the following description and claims taken in connection with the accompanying drawing forming a part of this application, in which:

Fig. 1 is a longitudinal sectional view of a portion of a tubular heat exchanger constructed in accordance with the invention;

Fig. 2 is an end elevational view of the structure shown in Fig. 1 with a portion broken away for the sake of clearness; and, Fig. 3 is an enlarged sectional view of a portion of the structure of Fig. 1.

In the drawing, there is shown a high-pressure head 10 including a body member 11 and a cover 12. The body member has a flange 13 at one end by which it is secured to a flange 14 of a tubular heat exchanger shell 16, by suitable means, such as bolts 17. Tubes 18 have terminal portions secured in the tube plate wall 19 of the body member, and they extend longitudinally through the shell to the return end (not shown) of the heat exchanger. As is usual, the shell 16 has an inlet 21, and, where the heat exchanger is of the multiple-pass type, as herein illustrated, the head is provided with an inlet 22 and an outlet 23 for the admission and discharge, respectively, of fluid under high pressure.

The body member 11 has an opening at one end which is counter-bored at 24 to receive the cover 12 and to provide a radially-extending sealing shoulder or surface 26 inwardly of the cover. Outwardly of the cover, the wall has an inwardly opening circumferential groove 27 providing a radially-extending thrust shoulder 28 facing the sealing surface 26.

The cover 12 is rabbetted at 30 to provide an outwardly facing seat 31 against which is positioned a relatively soft pressure-sealing gasket 32. A second rabbet 33, in conjunction with the rabbet 30, provides a space 34 for the reception of a one-piece pressure ring 36, having an inwardly-facing surface 37 abutting the outer surface of the gasket 32.

A shear ring 39 closely fits in the groove 27 and abuts the thrust shoulder 28 thereof. To facilitate assembly of the shear ring 39 in the groove 27, the former is divided into a plurality of arcuate sections or shear pieces, for example, 40, 41, 42 and 43. To provide for contiguity of adjacent end faces of the sections and for insertion and removal of the latter, all of such faces extend radially except the faces at either end of the section 43, which are parallel, thereby providing for insertion of the latter section last and the removal thereof first.

A plurality of bolts 44 are threadedly mounted in the shear ring 39, and extending entirely therethrough axially of the heat exchanger, with their inner ends engaging the outer surface of the pressure ring 36.

Radial displacement of the shear ring sections is prevented by the presence of a retaining ring 46, which is secured in any desired manner, as by bolts 47, to the outer surface of the cover 12. This ring is of such external diameter as to be closely received within the shear ring 39, whereby radial inward movement of the sections of the latter is prevented.

Where the heat exchanger is of the two-pass type, as herein illustrated, the head is divided interiorly by a partition 50, separating the two tube passes. Preferably, the partition 50 is secured to the tube plate wall and the cylindrical side walls of the body member 11 by welding, as at 51. The outer edge of the partition is flush with the surface 26 on the inner circumference of the body member. The cover 12 is provided on its inner surface with a chordal groove 52 aligned with and receiving the outer edge of the partition 50, and is rabbeted circumferentially at its outer edge at 53 to a depth corresponding to the depth of the groove 52. A gasket having an annular portion 54 and a diametric portion 55 is positioned in the rabbet and the groove to provide a seal against leakage from one pass to the other. The rabbet and groove are of such depth that if a slight outward movement of the cover 12 should occur, the gasket will not be uncovered laterally and hence will be retained in its proper position.

In assembling, the cover 12, with the gasket portions 54 and 55 disposed in the circumferential rabbet 53 and the groove 52, respectively, is inserted in the counterbore, the pressure-sealing gasket being placed against its seat 31 with the pressure ring 36 disposed outwardly thereof. The shear ring 39 is positioned in the groove 27 and the retaining ring 46 bolted in place. As the bolts 44 in the shear ring are tightened, the pressure-sealing gasket 32 will be compressed without movement of the cover. When the hydrostatic test is placed on the head there may be a slight outward movement of the cover as the pressure sealing gasket is further compressed by the internal fluid pressure against the cover. If such movement occurs, the bolts 44 may be tightened further so as to force the cover inwardly against the gasket 54 and 55, or the pressure may be temporarily released and the bolts then tightened so as to move the cover in against the inner gaskets. Once the pressure-sealing gasket 32 has been subjected to the full test pressure, there will be practically no further compression thereof.

With the construction herein disclosed, the head is pressure-sealed by the gasket 32, the gaskets 54 and 55 serving to prevent interpass leakage.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a heat exchanger high-pressure head comprised by a body including tube plate and cylindrical wall portions, said wall portion having an interior outwardly-facing seat arranged intermediately of the length thereof and having a cylindrical bore extending from the seat to its outer end with an annular groove opening into the bore and arranged intermediately of the shoulder and said outer end, one or more partitions connected to the cylindrical wall portion and the tube plate portion to provide compartments for the latter, and gasket means including portion or portions cooperating with the partition edge or edges; a circular cover disposed in the cylindrical bore with its inner face engaging said gasket means to prevent interpass leakage, shear pieces arranged in the annular groove and providing an outer supporting abutment for the cover resisting the force of fluid pressure applied to the latter, means providing a seal between the cover and the cylindrical bore and tightened by fluid pressure applied to the inner face of the cover, a pressure ring between the last-mentioned means and the shear pieces, and a plurality of bolts threadedly mounted in the latter with their ends abutting the pressure ring and their heads accessible exteriorly of the high pressure head, whereby, if outward movement of the cover relative to the head occurs upon initial application of internal pressure to the head, the bolts may be tightened to return the cover to its innermost position to prevent interpass leakage.

2. In a heat exchanger high-pressure head comprised by a body including tube plate and cylindrical wall portions, said wall portion having an interior outwardly-facing seat arranged intermediately of the length thereof and having a cylindrical bore extending from the seat to its outer end with an annular groove opening into the bore and arranged intermediately of the shoulder on said outer end, one or more partitions autogenously connected to the cylindrical wall and tube plate portions to provide compartments therefor, said partition or partitions extending so as to be flush with the outwardly-facing seat, and gaskets cooperating with said seat and the partition edge or edges; a circular cover in the cylindrical bore, said cover having an inner peripheral rabbet and chordal groove or grooves for alignment, respectively, with the seat and with the partition or partitions and receiving the gaskets cooperating with said seat and partition edge or edges, a split shear ring arranged in the annular groove, a pressure-sealing gasket abutting the cover and the cylindrical bore, a pressure ring disposed between the shear ring and the gasket, and a plurality of compression bolts threadedly mounted in the shear ring and extending therethrough with their ends engaging the pressure ring, whereby fluid pressure applied to the inner face of the cover is transmitted through the last-mentioned gasket, the pressure ring and the bolts to the shear ring, the heads of said bolts being accessible from exteriorly of the high pressure head, whereby, if outward movement of the cover relative to the head occurs upon initial application of internal pressure to the head, the bolts may be tightened to return the cover to its innermost position to prevent interpass leakage.

JOHN P. RATHBUN.